J. V. L. PEACOCK.
WHEEL HUB.
APPLICATION FILED MAR. 7, 1917.

1,234,080.

Patented July 17, 1917.
2 SHEETS—SHEET 1.

Witness
C. P. Beall.
H. F. Riley

Inventor
J. V. L. Peacock.
By
A. Randolph Jr.
Attorney

J. V. L. PEACOCK.
WHEEL HUB.
APPLICATION FILED MAR. 7, 1917.

1,234,080.

Patented July 17, 1917.
2 SHEETS—SHEET 2.

Witness
OR Beale
HV Riley

Inventor
J.V.L. Peacock,
By A. Randolph Jr.,
Attorney

UNITED STATES PATENT OFFICE.

JAMES V. L. PEACOCK, OF DOTHAN, ALABAMA, ASSIGNOR OF ONE-HALF TO WESLEY P. KIRKLING, OF DOTHAN, ALABAMA.

WHEEL-HUB.

1,234,080.   Specification of Letters Patent.   Patented July 17, 1917.

Application filed March 7, 1917. Serial No. 153,051.

*To all whom it may concern:*

Be it known that I, JAMES V. L. PEACOCK, a citizen of the United States, residing at Dothan, in the county of Houston and State of Alabama, have invented certain new and useful Improvements in Wheel-Hubs; and I do hereby declare the following to be a full, clear, and exact description of the invention, such as will enable others skilled in the art to which it appertains to make and use the same.

The invention relates to improvements in wheel hubs.

The object of the present invention is to improve the construction of wheel hubs and to provide a simple, practical and efficient wheel hub of strong durable and inexpensive construction designed for use on the wheels of Ford automobiles and adapted to be substituted for the hubs thereof and capable of enabling the Timken roller bearings to be employed instead of the ball bearings of the Ford machine.

A further object of the invention is to provide a hub of this character equipped with a lubricating means adapted to afford an ample supply of lubricant to the inner bearing and capable of simultaneously bracing the hub structure to increase the strength and durability thereof.

With these and other objects in view, the invention consists in the construction and novel combination of parts hereinafter fully described, illustrated in the accompanying drawings and pointed out in the claims hereto appended; it being understood that various changes in the form, proportion, size and minor details of construction, within the scope of the claims, may be resorted to without departing from the spirit or sacrificing any of the advantages of the invention.

In the drawings.

Like numerals of reference designate corresponding parts in the several figures of the drawings.

Figure 1:
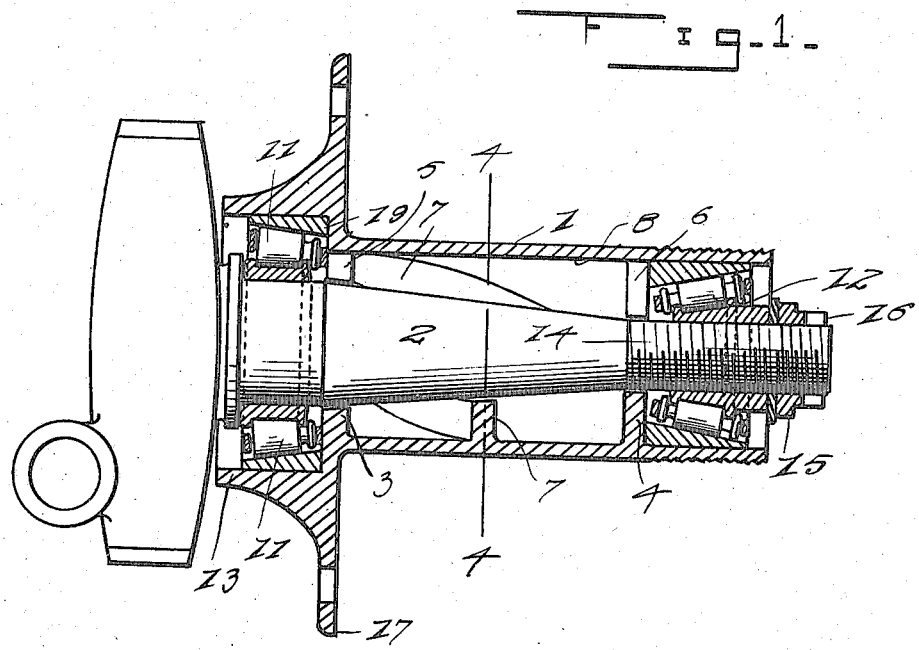
Figure 1 is a longitudinal sectional view of a hub constructed in accordance with this invention.

In the accompanying drawings, in which is illustrated the preferred embodiment of the invention, 1 designates a hub designed to be used in connection with an ordinary Ford automobile spindle 2 without necessitating any alteration in the construction thereof and by merely substituting the improved hub for the Ford hub. The hub 1, which preferably consists of a casting, may be constructed of any suitable material and it is built up exteriorly and provided interiorly with inner and outer transverse walls or flanges 3 and 4, which have radial recesses or openings 5 and 6 for the passage of the lubricant. The lubricant may be supplied to the hub in any desired manner, such as by packing the hub as is now done on Ford machines. The radially arranged openings 5 and 6 may be of any desired size and of any required number to provide the necessary feed of the lubricant, and in order to provide a positive feed of the lubricant from the space between the inner and outer walls or flanges and the inner bearing, spiral longitudinally disposed flanges 7 are provided. The flanges 7, which are formed integral with the body of the hub, extend along the lubricant space or chamber 8 from one of the said transverse walls or flanges to the other and they connect with the said flanges and coöperate with the same to form a rigid interior bracing structure. The flanges or walls have central openings 9 and 10 and are of a size just sufficient to clear the spindle 2.

The hub 1 receives inner and outer Timken roller bearings 11 and 12, the inner Timken bearing being arranged within the enlarged portion 13 at the inner end of the hub and the outer bearing 12 being arranged within the outer portion of the hub. The outer portion of the spindle is threaded at 14 to receive the outer Timken bearing and the lock nut 15 and a cotter pin or key 16 is employed for securing the lock nut on the end of the spindle. The interior of the end portions of the hub are enlarged and are cylindrical to receive the bearings 11 and 12, and as the latter are of the ordinary construction of Timken roller bearing a detail description of the parts thereof is deemed unnecessary. The hub is also designed to be provided with the usual means for excluding the dust and dirt from the interior.

Figure 6:
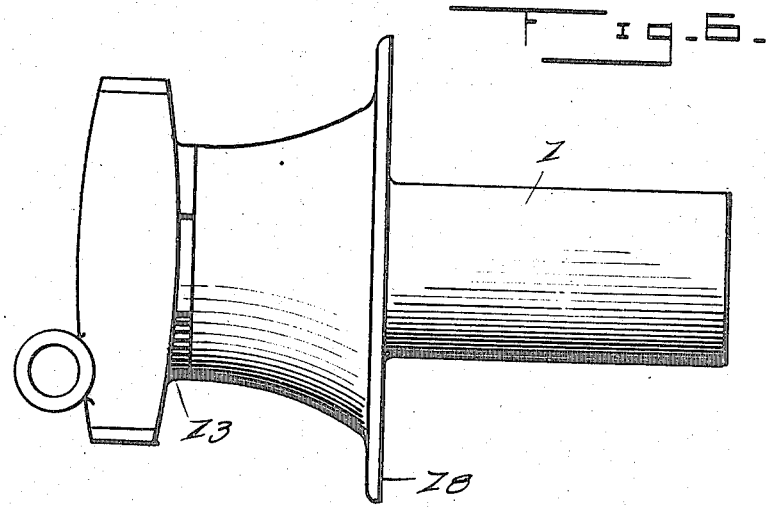
Fig. 6 is a side elevation showing the integral hub flange arranged to provide a sixty inch wheel gage or tread.
Figure 2:
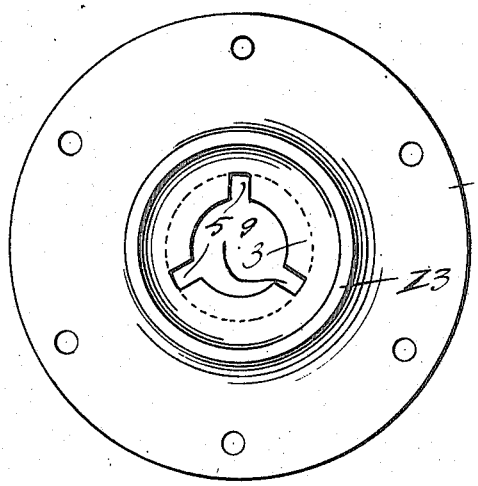
Fig. 2 is an end elevation of the hub, the inner bearing being removed.
Figure 3:
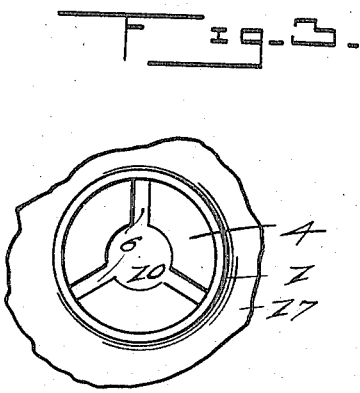
Fig. 3 is a similar view, the outer bearing being removed to show the outer transverse annular flange or wall of the lubricant chamber.
Figure 4:
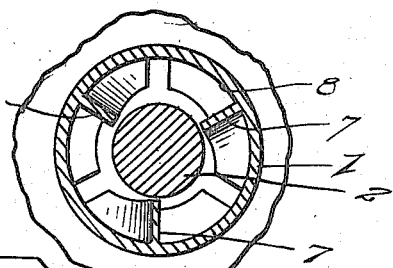
Fig. 4 is a transverse sectional view on the line 4—4 of Fig. 1.
Figure 5:
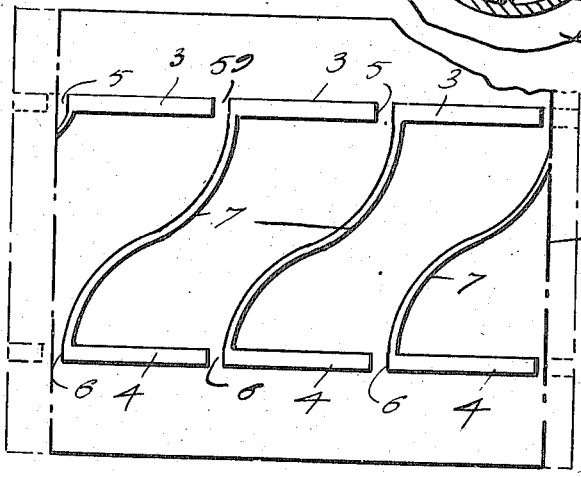
Fig. 5 is a diagrammatic view illustrating the arrangement of the spiral flanges and the openings or passages of the transverse walls or flanges of the hub.

In Fig. 1 of the drawings the hub flange 17 is arranged to provide the ordinary fifty-six inch tread or gage, and in Fig. 6 of the drawings the flange 18 is arranged to provide a sixty inch tread or gage to suit the requirement of certain sections of the country, and the flanges of course may be disposed at any desired point to provide the desired distance between the treads of the wheels.

It will be clear that the hub is exceedingly simple and inexpensive in construction, that it is adapted to be readily substituted for the ordinary Ford hub to enable Timken roller bearings to be used on Ford automobile wheels, and that the strength and durability of the hub are materially increased. Also it will be apparent that the bracing and strengthening means operates to feed the lubricant positively from the lubricant chamber to the inner roller bearing so that a continuous supply of lubricant is maintained at the inner portion of the hub. Also it will be clear that the tread or gage of the machine may be readily changed by employing the form of hub having the flange arranged as shown in Fig. 6 of the drawings.

The longitudinal spiral flanges 7 conform to the configuration of and are arranged to clear the spindle, and the walls or flanges form the shoulders for the bearings, the inner transverse wall or flange being arranged coincident with the shoulder 19 formed by the enlarging of the inner end of the hub to receive the inner bearings.

What is claimed is:

1. A hub of the class described provided with inner and outer bearings and having spaced inner and outer transversely disposed walls or flanges forming an intermediate lubricant chamber and provided with spindle receiving openings, said hub being also provided with longitudinally disposed spiral flanges extending from one end of the lubricant chamber to the other and bracing the hub and the said walls or flanges and adapted to feed the lubricant from the lubricant chamber to the inner end of the hub.

2. A hub of the class described provided with inner and outer cylindrical portions and adapted to receive the ordinary roller bearings, said hub being provided with inner and outer annular transverse walls forming shoulders for the said bearings and provided with openings for the passage of lubricant, and spiral flanges extending along the hub between the said walls or flanges and adapted to feed the lubricant positively to the inner end of the hub for supplying the inner bearing with the lubricant.

In testimony whereof I affix my signature in presence of two witnesses.

JAMES V. L. PEACOCK.

Witnesses:
BENNETT S. JONES,
M. I. LEWIS.